United States Patent
Sawyer et al.

(10) Patent No.: US 6,822,947 B2
(45) Date of Patent: Nov. 23, 2004

(54) RADIO NETWORK EMULATOR FOR A PACKET CORE NETWORK

(75) Inventors: François Sawyer, St-Hubert (CA); Pierre Maillette, Montréal (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 811 days.

(21) Appl. No.: 09/775,929

(22) Filed: Feb. 2, 2001

(65) Prior Publication Data

US 2002/0105921 A1 Aug. 8, 2002

(51) Int. Cl.$^7$ .................................................. H04Q 7/00
(52) U.S. Cl. ..................... 370/328; 455/525; 703/13; 703/23; 717/134; 717/135; 717/138
(58) Field of Search .................. 370/328, 395.52, 370/401, 230, 235.1, 254, 356, 392, 396, 397, 402, 360, 395.6, 395.65, 386, 389, 395.53; 717/138, 134, 135; 703/13, 14, 19, 15, 16, 17, 20, 21, 23, 24, 25, 26, 27, 28, 4; 455/422.1, 460, 524, 525, 12, 67; 709/201, 202, 311

(56) References Cited

U.S. PATENT DOCUMENTS

| | | | | |
|---|---|---|---|---|
| 4,907,247 A | * | 3/1990 | Miyake et al. | ............... 375/224 |
| 5,805,588 A | * | 9/1998 | Petersen | ..................... 370/356 |
| 5,892,763 A | * | 4/1999 | Laraqui et al. | ......... 370/395.53 |
| 6,081,836 A | * | 6/2000 | Karapetkov et al. | ......... 709/218 |
| 6,137,799 A | * | 10/2000 | Karapetkov et al. | ... 370/395.53 |
| 6,535,515 B1 | * | 3/2003 | Hasegawa et al. | ..... 370/395.52 |
| 6,678,273 B1 | * | 1/2004 | Brown | ..................... 370/395.2 |

* cited by examiner

Primary Examiner—Wellington Chin
Assistant Examiner—Jamal A. Fox
(74) Attorney, Agent, or Firm—Jenkens & Gilchrist, P.C.

(57) ABSTRACT

A packet core network (PCN) includes a plurality of interconnected routers. An emulator is provided along with at least one of the routers and operates to control transmission of Internet Protocol (IP) datagrams there through in order to simulate the effects of having one of the non-radio inter-router connections fictionally comprise a wireless cellular radio link. The emulator responds to user input specifying wireless cellular radio link conditions to determine a time delay to be applied by the router against the transmission of each datagram. This time delay is set roughly equivalent to the delay introduced, under the user specified wireless cellular radio link conditions, by emulated radio link operation to erase uncorrectable frames to obtain retransmission. The emulator further sets a data rate for router handling of datagrams based on the user input to simulate congestion on the radio link due to the presence of other, competing users.

36 Claims, 1 Drawing Sheet

RADIO NETWORK EMULATOR FOR A PACKET CORE NETWORK

BACKGROUND OF THE INVENTION

1. Technical Field of the Invention

The present invention relates to emulation systems and, in particular, to an emulation system that simulates the effects of radio network operation on packet data transmissions within a packet core network including a wireless link.

2. Description of Related Art

A packet core network (PCN), such as the one used in a cdma2000 network, is configured in a manner much like other data communications networks. These networks include a succession of routers (or other communications nodes) that are interconnected and carry internet protocol (IP) traffic. In some cases, a radio link is provided between two routers of the network. This radio link introduces a phenomenon that is not often experienced in conventional data communications networks: that is, data transmission errors.

Transmission control protocol (TCP) is built such that when an error is detected in a packet transmission, the complete IP datagram is retransmitted. This error correction operation works fine when the data is transmitted over Ethernet or fiber (which have very low error rates on the order of 10E-07). In the case where the packet core network includes a radio network component, such as, for example, a radio communications link, the error rate may be much higher (on the order or 10E-03). Given the transmission of substantially large sized IP packets (for example, greater than one-thousand bits), there is a significant chance that each packet of a transmission carried over the radio link will experience an error. This would necessitate an extraordinarily large number of TCP retransmissions that may effectively block successful data transmission over the packet core network.

To address the foregoing concerns over packet size and TCP retransmissions, the radio network portion of the packet core network transmits data over the wireless radio link in airframes that are much smaller than typical IP datagrams. The IP datagram is segmented into a plurality of smaller packet data units (PDUs) or airframes that are communicated over the radio link. To combat the data transmission error problem over the radio link, cyclical redundancy check (CRC) and forward error correction (FEC) techniques are implemented with respect to each PDU transmission. At the receiver, errors in a radio link transmitted PDU are detected by the CRC and corrected by the FEC. If the detected error cannot be FEC corrected, the PDU (frame) is erased and a request is made for a retransmission of that frame (not the entire datagram as would be required by TCP). The net result is that transmission over the wireless radio link may be made essentially error free, but frame erasures and requests for retransmission will introduce to some degree a time delay in overall data transmission through the network. It is accordingly recognized that as the frame erasure rate (FER) increases for transmissions made in this manner, so does the associated network transmission delay.

Another concern with the use of a wireless radio link for packet data communications centers on bandwidth limitations. In spite of the improvements being made in wireless communications spectrum efficiency, existing wireless communications technologies (such as 2.5 G and 3 G cellular air interface technologies) have severely limited bandwidths in comparison to Ethernet or fiber communications networks. While the available bandwidth may be satisfactory when only one user (or limited small number of users) is accommodated for data communications, the per user available bit rate for data communications through the network over the wireless radio link rapidly decreases as the number of users increases. This problem is magnified when an essentially unlimited bandwidth Ethernet or fiber based packet core network is integrated with a restricted bandwidth radio network that acts as a bottleneck for data transmissions.

Communications engineers often need to test or demonstrate the operation of a packet core network. The implemented network available for testing may not physically include a radio network that includes a wireless radio link interconnection between routers. For purposes of such a demonstration, however, a need often exists to test how applications communicating over the packet core network would react if a radio network were included and if radio conditions on that network were less than ideal (i.e., when the data transmission frame erasure rate increases and/or the number of users increases with respect to use of the radio link). The present invention allows for this testing to be performed on a non-radio packet core network by simulating the adverse effects on data packet transmission experienced when communications are made over a radio link.

SUMMARY OF THE INVENTION

A plurality of routers are interconnected by communications links to form a packet core network (PCN). At one router, an emulator is provided to manipulate the transmission of internet protocol (IP) datagrams through the router in order to simulate the transmission effects of having one of the inter-router communications links fictionally comprise a radio link. This is accomplished by having the emulator determine a time delay that is applied against the transmission of each IP datagram. The effect of the applied delay is to simulate emulated radio link operation to erase received frames containing uncorrectable errors and request retransmission of those frames.

In another embodiment of the invention, a plurality of routers are interconnected by communications links to form a packet core network (PCN). At one router, an emulator is provided to manipulate the transmission of internet protocol (IP) datagrams through the router in order to simulate the transmission effects of having one of the inter-router communications links fictionally comprise a radio link. This is accomplished by having the emulator limit a data rate for router node handling of IP datagrams transmitted through the packet core network. The effect of the limited data rate operation is to simulate congestion on the emulated radio link due to the presence of other, competing users.

The emulator receives user input specifying radio link conditions (such as, for example, number of users, bit error rate, signal to noise ratio, frame erasure rate, mobile platform speed, and mobile to base distance). This input is used to determine a frame erasure rate (FER) value indicative of how frequently packet data units (PDUs) transmitted over the radio link are likely to be received with an uncorrectable error. From this value, a time delay is determined that is representative of the delay introduced in the through transmission of the IP datagrams due to the effect of frame erasures and retransmissions with respect to PDU transmissions over the emulated radio link. This input is further used to determine the data rate limitation imposed on router communication handling due to congestion from competing users of the emulated radio link.

In an embodiment of the invention, the packet core network comprises a non-radio packet core network and the radio link to be emulated comprises a wireless cellular radio link.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
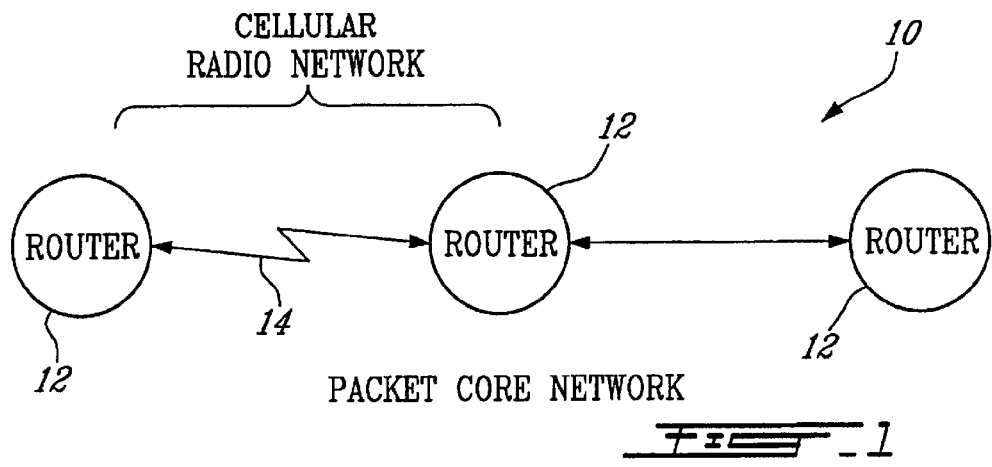
FIG. 1 is a block diagram of a packet core network including a wireless radio link interconnection between two routers.

Reference is now made to FIG. 1 wherein there is shown a block diagram of a packet core network 10 comprised of a plurality of interconnected routers and/or other nodes (including, for example, mobile terminals, and all generally referred to as routers 12) carrying internet protocol (IP) traffic. At least two of the routers 12 are interconnected using a wireless radio link 14 that may comprise any suitable cellular wireless air interface including, but not limited to, those air interfaces known in the art for use in 2.5 G or 3 G wireless cellular communications systems. As discussed above, and as is recognized by those skilled in the art, the presence of the wireless cellular radio link 14 within the packet core network 10 introduces a number of concerns that are not encountered with conventional wireline interconnected networks such as, for example, severe bandwidth limitations and data transmission errors.

In the context of designing, planning and testing packet core networks, it may not always be feasible to build the network of FIG. 1 to include the cellular radio link. The communications engineer may have to settle for a demonstration network including interconnected routers that does not include a wireless cellular radio link 14 or alternatively includes a wireless link whose operational characteristics do not match wireless cellular air interface technologies. Notwithstanding this architectural limitation which precludes inclusion of a wireless cellular radio link interconnection between routers, a need often arises to test the demonstration network in conditions where communications over a wireless component part of the network are less than satisfactory. The present invention addresses this need by simulating the adverse effects of wireless cellular communications operation on data transmissions carried over the packet core network.

Figure 2:
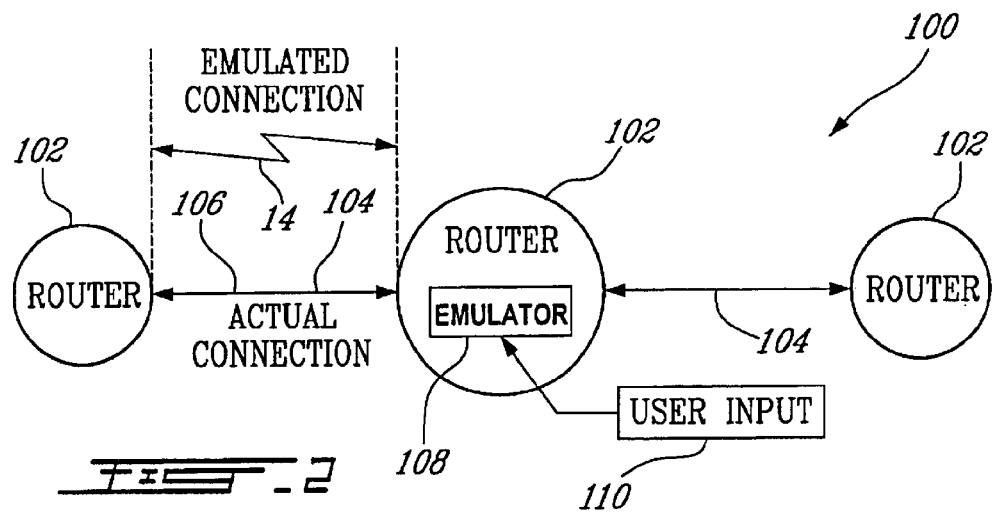
FIG. 2 is a block diagram of a demonstration packet core network including a radio network emulation system of the present invention.

Reference is now made to FIG. 2 wherein there is shown a block diagram of a demonstration packet core network 100 comprised of a plurality of interconnected routers and/or other nodes (all generally referred to as routers 102) carrying internet protocol (IP) traffic. The routers 102 are most likely interconnected by wireline technologies (such as Ethernet or fiber) 104. However, two of the routers 102 may alternatively be interconnected using a wireless radio link 106. It should be recognized that this wireless interconnection 106 (possibly using for instance wireless LAN technology), while providing for a simple level of mobility within the network, is not the preferred network implementation and does not have the operational properties of those air interfaces known in the art for use in 2.5 G or 3 G wireless cellular communications systems. In general, such packet core networks without wireless cellular interconnections are referred to herein as "non-radio packet core networks" or the network 100. The network 100 accordingly further includes an emulator 108 that simulates the effects on network 100 operation that would likely arise if the network utilized a fictional cellular wireless radio link 14 like that shown in FIG. 1 as a network component for interconnecting two of the routers.

The emulator 108 may be implemented at any router 102 within the network 100 (or alternatively may be implemented as a computer that can act as, or like, a router). Operation of the emulator 108 accordingly mimics router operation in that it receives and forwards IP datagrams. The emulator 108, however, further includes a functionality for delaying the forwarding of the IP datagrams in a manner and to a degree that simulates the effects of having two routers 102 within the network 100 be interconnected by a FIG. 1 illustrated cellular wireless radio link 14. The implicated delays are set to provide network operation that is adversely affected by the severe bandwidth limitations and data transmission errors that are introduced by the use of a cellular type wireless interconnection. A user input 110 to the emulator 108 allows the communications engineer in demonstrating the operation of the network 100 to vary the degree to which network operation is adversely affected in view of one factor or condition, or a combination of several factors or conditions, such as, for example, specific radio performance measurements like bit error rate (BER), signal to noise ratio (SNR), and/or frame erasure rate (FER), as well as conditions like mobile platform speed, radio propagation distance, and number of users.

Figure 3:
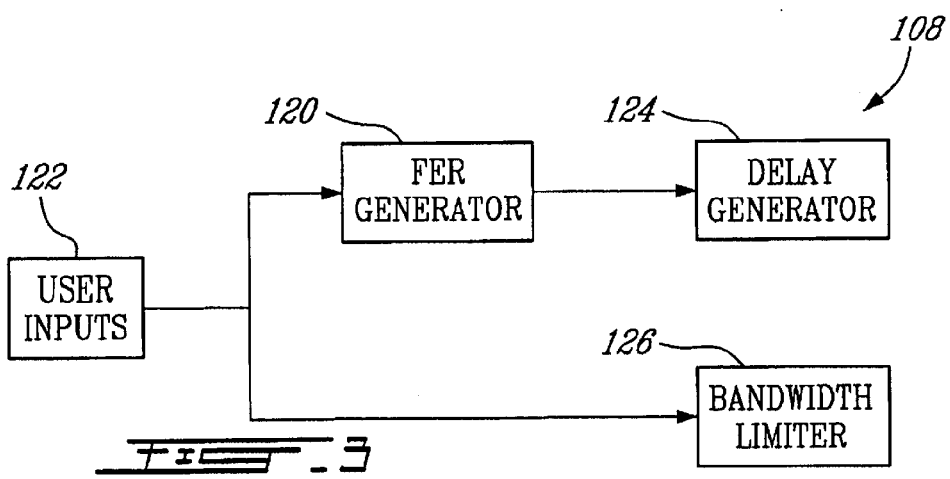
FIG. 3 is a block diagram of an emulator in accordance with the present invention.

Reference is now made to FIG. 3 wherein there is shown a block diagram of an emulator 108 in accordance with the present invention. A frame erasure rate (FER) generator 120 is seeded by manual user inputs 122 to generate a frame erasure rate value that specifies a value indicative of how frequently packet data units (PDUs) transmitted over a wireless cellular radio link (and corrupted in accordance with the user specified inputs) are likely to be received with an un-correctable error. As discussed above, when this occurs, the receiving router 102 erases the PDU and requests a retransmission. The end result of this action introduces a delay in the through transmission of those individual PDUs over the network 100. The emulator 108 preferably does not actually perform the erasure and request a retransmission. Instead, the specified FER value output from the generator 120 is applied to a delay generator 124 that maps the FER value to a delay value and acts to delay through transmission of IP datagrams by the router 102 by the delay value to a degree that simulates the effect of frame erasures and retransmissions on the handling of PDU transmissions over the network 100. More specifically, the time delay is representative of a likely delay that would be experienced in the transmission of those IP datagrams as PDUs if they had in fact been transmitted over the emulated radio network component due to the effect of PDU erasures and retransmissions as specified by the FER value.

The emulator 108 further includes a bandwidth limiter 126 that is also seeded by manual user inputs 122 to adjust the amount of bandwidth available for data communications over the wireless radio link. As discussed above, when this occurs the available bit rate for data communications handled is reduced. This result is simulated by the emulator by correspondingly adjusting the throughput bit rate for handling IP datagrams to a degree that simulates the effect of having additional, competing, users of the radio link and a corresponding slowing of PDU data rate transmission. Put another way, the adjusted throughput data rate provides a limited data rate that is representative of a likely data rate that would be experienced in the transmission of those IP datagrams as PDUs if they had in fact been transmitted over the emulated radio network component due to the presence of other, competing users on the radio network (i.e., congestion).

A variety of manual user inputs 122 may be accommodated and processed by the emulator 108. For example, mobile platform speed, distance from the mobile platform to a fixed base station and traffic load as a function of number of users may be input. Each of these inputs (speed, distance and load) has an effect on the overall specified frame erasure rate (FER) value that is output from the generator 120 and thereafter used to determine PDU delay. In one possible implementation, the delay generator 124 is implemented with a transfer function that delays handling of IP packets through the router in accordance with a normal distribution curve (or other statistical function) that is seeded by the specified FER value. This transfer function further operates to react to the length of the IP packets and the length of the air frames (i.e., how many air frames are needed to send each IP packet) in determining the delay. The traffic load input further has an effect on the amount of available bandwidth that is applied by the bandwidth limiter 126 to control the throughput data rate of PDU transmissions. In this regard, the bandwidth limiter shares the total available bandwidth on the radio link between the users (both actual and fictional) in accordance with requested data rates (which can be supplied through the user input 122).

The traffic load manual user input specifies the number of users concurrently using the radio link. This input may further specify the data rate for each of the users. The load generated by the application being demonstrated in connection with the network 100 is further input and added to the other user load input(s) to determine an overall traffic load value.

The determined overall traffic load value is then used to determine the FER as a function of traffic load. The specification of this transfer function may be made in accordance with any suitable curve. As an example, a curve inspired by analysis of the power control function of a cdma2000 channel may by used.

The mobile platform speed manual user input specifies the speed of the platform and this value is related to FER in accordance with a transfer function defined by any suitable curve. As an example, a curve loosely based on corresponding measurement results within a wideband CDMA 1900 system may be used.

The mobile to base distance manual user input specifies the range of the platform and this value is related to FER in accordance with a transfer function defined by any suitable curve. As an example, a curve loosely based on corresponding measurement results within a wideband CDMA 1900 system may be used.

Each of the foregoing transfer functions contributes an FER component to the overall FER value that is output from the generator 120 and thereafter used to determine PDU delay. As one example, the FER component values may be linearly summed to obtain the overall value. Other mathematical operations (including weighting, algebraic manipulation, and the like) may be used to derive the overall FER value from the component FER values. It should further be understood that the specification of FER component values relating to load, speed and distance is made by way of example only and that other additional or substitute FER component values may be derived by the generator 120.

The delay generator 124 does not operate to actually split the IP datagrams into airframes (PDUs). Instead, a calculation is made of the number of airframes that would normally be required to transmit the datagram over the radio link. This calculation takes into account possible IP header compression factors. Based on this number of airframes, an adjustment is made to the retransmission probability due to the overall FER value, and a corresponding overall delay is applied to the datagrams that would in effect simulate the actual transmission over the radio link. More specifically, at a rate corresponding to the overall FER value onto a normal distribution curve, a delay is added to the datagram transmission through the router that is equal to the normal retransmission delay for the corresponding airframes.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A radio network emulator for use at a router node of a packet core network, comprising:

a frame erasure rate generator responsive to user input specifying a condition of a fictional radio network component of the packet core network to be emulated and operable to generate from the specified condition a frame erasure rate value indicative of how frequently packet data units (PDUs) transmitted over the emulated radio network component are likely to be received with an uncorrectable error; and a time delay generator that receives the frame erasure rate value, maps that value to a time delay value and applies a corresponding time delay against router node handling of IP datagrams transmitted through the packet core network, wherein the time delay is representative of a likely delay that would be experienced in the transmission of those IP datagrams as PDUs over the emulated radio network component due to the effect of PDU erasures and retransmissions indicated by the frame erasure value.

2. The emulator as in claim 1 wherein the emulated radio network component comprises a wireless cellular radio network connection between router nodes.

3. The emulator as in claim 2 wherein the packet core network comprises a non-radio packet core network.

4. The emulator as in claim 1 wherein the emulator comprises the router node.

5. The emulator as in claim 1 wherein the emulator comprises a computer configured to act as a router node.

6. The emulator as in claim 1 wherein the user input specifying the condition provides a frame erasure rate value as a function of a certain variable relating to emulated radio network component operation.

7. The emulator as in claim 6 wherein the variable comprises at least one of:

speed of movement for a platform communicating over the emulated radio network component;

distance between the platform and a fixed base station in the emulated radio network component; and traffic load for communications over the emulated radio network component.

8. The emulator as in claim 1 further including a bandwidth limiter responsive to user input specifying the condition of the fictional emulated radio network component of the packet core network and operable to limit a data rate for router node handling of IP datagram transmissions through the packet core network, wherein the limited data rate is representative of a likely data rate given the specified condition that would be experienced in the transmission of those IP datagrams as PDUs over the emulated radio network component due to congestion from other, competing users.

9. A method for radio network emulation in connection with the operation of a packet core network, comprising the steps of:
   receiving user input specifying a condition of a fictional radio network component of the packet core network to be emulated;
   generating a frame erasure rate value from the specified condition indicative of how frequently packet data units (PDUs) transmitted over the emulated radio network component are likely to be received with an uncorrectable error;
   mapping that frame erasure value to a time delay value; and
   applying a corresponding time delay against router node handling of IP datagrams transmitted through the packet core network, wherein the time delay is representative of a likely delay that would be experienced in the transmission of those IP datagrams as PDUs over the emulated radio network component due to the effect of PDU erasures and retransmissions indicated by the frame erasure value.

10. The method as in claim 9 wherein the emulated radio network component comprises a wireless cellular radio network connection between router nodes.

11. The method as in claim 10 wherein the packet code network comprises a non-radio packet core network.

12. The method as in claim 9 wherein the step of receiving comprises the step of specifying the condition of the emulated radio network component with a frame erasure rate value set as a function of a certain variable relating to radio network operation.

13. The method as in claim 12 wherein the variable comprises at least one of:
   speed of movement for a platform communicating over the emulated radio network component;
   distance between the platform and a fixed base station in the emulated radio network component; and
   traffic load for communications over the emulated radio network component.

14. The method as in claim 9 further including the step of:
   limiting a data rate for IP datagram transmission through the router node of the packet core network, wherein the limited data rate is representative of a likely data rate given the specified condition that would be experienced in the transmission of those IP datagrams as PDUs over the emulated radio network component due to congestion from other, competing users.

15. A method for radio network emulation in connection with the operation of a packet core network, comprising the steps of:
   applying a time delay against router node handling of IP datagrams transmitted through the packet core network, wherein the time delay is representative of a likely delay that would be experienced in the transmission of those IP datagrams as packet data units (PDUs) over a fictional radio network component of the packet core network to be emulated due to the effect of PDU erasures and retransmissions; and
   limiting a data rate for IP datagram transmission through the packet core network, wherein the limited data rate is representative of a likely data rate that would be experienced in the transmission of those IP datagrams as PDUs over the emulated radio network component due to congestion from other, competing users.

16. The method as in claim 15 wherein the emulated radio network component comprises a wireless cellular radio network connection between router nodes.

17. The method as in claim 16 wherein the packet core network comprises a non-radio packet core network.

18. The method as in claim 15 wherein the step of applying comprises the steps of:
   receiving user input specifying a condition of the emulated radio network component;
   generating a frame erasure rate value from the specified condition indicative of how frequently PDUs transmitted over the emulated radio network component are likely to be received with an uncorrectable error; and
   mapping that frame erasure value to a time delay value for application against router node handled IP datagrams.

19. The method as in claim 18 wherein the received user input comprises one of:
   speed of movement for a platform communicating over the emulated radio network component;
   distance between the platform and a fixed base station in the emulated radio network component; and
   traffic load for communications over the emulated radio network component.

20. The method as in claim 15 wherein the step of limiting comprises the steps of:
   receiving user input specifying a condition of the emulated radio network component; and
   generating the limited data rate from the specified condition.

21. The method as in claim 20 wherein the received user input comprises traffic load for communications over the emulated radio network component.

22. A radio network emulator for use at a router of a packet core network, comprising:
   a delay generator operable to apply a time delay against router node handling of IP datagrams transmitted through the packet core network, wherein the time delay is representative of a likely delay that would be experienced in the transmission of those IP datagrams as packet data units (PDUs) over a fictional radio network component of the packet data network to be emulated due to the effect of PDU erasures and retransmissions; and
   a bandwidth limiter operable to limit a data rate for IP datagram transmission through the packet core network, wherein the limited data rate is representative of a likely data rate that would be experienced in the transmission of those IP datagrams as PDUs over the emulated radio network component due to the presence of other, competing users on the radio network.

23. The emulator as in claim 22 wherein the emulated radio network component comprises a wireless cellular radio network connection between router nodes.

24. The emulator as in claim 23 wherein the packet core network comprises a non-radio packet core network.

25. The emulator as in claim 22 further comprising:
   a user input for specifying a condition of the emulated radio network component; and
   a frame erasure rate generator that generates a frame erasure rate value from the specified condition indicative of how frequently PDUs transmitted over the emulated radio network component are likely to be received with an uncorrectable error, the frame erasure value being mapped to a time delay value for application against router node handled IP datagrams.

26. The emulator as in claim 25 wherein the user input comprises one of:
   speed of movement for a platform communicating over the emulated radio network component;
   distance between the platform and a fixed base station in the emulated radio network component; and
   traffic load for communications over the emulated radio network component.

27. The emulator as in claim 22 further comprising:
   a user input for specifying a condition of the emulated radio network component; and
   the bandwidth limiter generating the limited data rate from the specified condition.

28. The emulator as in claim 27 wherein the received user input comprises traffic load for communications over the emulated radio network component.

29. A radio network emulator for use at a router node of a packet core network, comprising:
   a bandwidth limiter responsive to user input specifying a condition of a fictional radio network component of the packet core network to be emulated and operable to limit a data rate for router node handling of IP datagrams transmitted through the packet core network, wherein the limited data rate is representative of a likely data rate given the specified condition that would be experienced in the transmission of those IP datagrams as packet data units (PDUs) over the emulated radio network component due to congestion from other, competing users.

30. The emulator as in claim 29 wherein the emulated radio network component comprises a wireless cellular radio network connection between router nodes.

31. The emulator as in claim 30 wherein the packet core network comprises a non-radio packet core network.

32. The emulator as in claim 29 wherein the emulator comprises the router node.

33. The emulator as in claim 29 wherein the emulator comprises a computer configured to act as a router node.

34. A method for radio network emulation in connection with the operation of a packet core network, comprising the steps of:
   receiving user input specifying a condition of a radio network component of the packet core network to be emulated; and
   limiting a data rate for router node handling of IP datagram transmissions through the packet core network, wherein the limited data rate is representative of a likely data rate given the specified condition that would be experienced in the transmission of those IP datagrams as PDUs over the emulated radio network component due to congestion from other, competing users.

35. The method as in claim 34 wherein the emulated radio network component comprises a wireless cellular radio network connection between router nodes.

36. The method as in claim 35 wherein the packet core network comprises a non-radio packet core network.

* * * * *